United States Patent
Li et al.

(10) Patent No.: US 12,109,914 B2
(45) Date of Patent: Oct. 8, 2024

(54) THREE-RAIL POWER SUPPLY CONTROL SYSTEM FOR ELECTRIFIED RAILWAY TRAIN

(71) Applicant: SOUTHWEST JIAOTONG UNIVERSITY, Chengdu (CN)

(72) Inventors: Qunzhan Li, Chengdu (CN); Kai Guo, Chengdu (CN); Shaofeng Xie, Chengdu (CN); Zihan Li, Chengdu (CN); Xiaohong Huang, Chengdu (CN); Yuhua Guo, Chengdu (CN); Shuqian Li, Chengdu (CN); Bo Wu, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 761 days.

(21) Appl. No.: 17/422,134

(22) PCT Filed: Jun. 27, 2019

(86) PCT No.: PCT/CN2019/093245
§ 371 (c)(1),
(2) Date: Jul. 9, 2021

(87) PCT Pub. No.: WO2020/143189
PCT Pub. Date: Jul. 16, 2020

(65) Prior Publication Data
US 2022/0089033 A1    Mar. 24, 2022

(30) Foreign Application Priority Data
Jan. 9, 2019  (CN) .......................... 201910019226.9

(51) Int. Cl.
*B60M 1/30* (2006.01)
*B60L 5/36* (2006.01)
*B60L 5/39* (2006.01)

(52) U.S. Cl.
CPC ................. *B60M 1/30* (2013.01); *B60L 5/36* (2013.01); *B60L 5/39* (2013.01); *B60L 2200/26* (2013.01)

(58) Field of Classification Search
CPC .. B60M 1/30; B60M 3/00; B60M 1/00; B60L 5/36; B60L 5/38; B60L 5/39; B60L 9/28; B60L 2200/26
See application file for complete search history.

(56) References Cited

U.S. PATENT DOCUMENTS

| 4,155,434 A | 5/1979 | Howell, Jr. |
| 4,234,065 A | 11/1980 | Jozumi et al. |

(Continued)

FOREIGN PATENT DOCUMENTS

| AU | 2016101444 A4 | 9/2016 | |
| CN | 102035400 A * | 4/2011 | ................ B60L 1/00 |

(Continued)

OTHER PUBLICATIONS

International Search Report of PCT/CN2019/093245 dated Sep. 26, 2019 (2 pages).

*Primary Examiner* — Zachary L Kuhfuss
(74) *Attorney, Agent, or Firm* — Calfee, Halter & Griswold LLP

(57) ABSTRACT

The present invention relates to the technical field of train power supply and operation control, and provides a three-rail power supply control system for an electrical railway train. Power supply rails in the system are divided into a first power supply rail, a second power supply rail, and a third power supply rail, wherein the first power supply rail, the second power supply rail, and a running rail constitute a three-phase AC power supply loop, and the third power supply rail and the running rail constitute a DC power supply loop. An AC-DC-AC variable voltage variable frequency device supplies power to a train traction motor by means of (Continued)

the three-phase AC power supply loop and current collectors. Frequency modulation and voltage regulation power supply is conducted by means of the AC-DC-AC variable voltage variable frequency device on the ground to achieve train driving and operation control. The DC power supply loop is powered by means of a rectifying device on the ground, and power is supplied to auxiliary electric equipment of the train by means of the current collectors. By changing the power supply mode of the system and optimizing the system structure, the weight and axle load of train-mounted equipment are effectively reduced, lightweight of the train is achieved, and the bearing efficiency of the train is improved, and moreover, automatic control and unmanned driving for train operation are achieved in the most economical way.

6 Claims, 1 Drawing Sheet

(56) References Cited

U.S. PATENT DOCUMENTS

| | | | | |
|---|---|---|---|---|
| 6,134,128 | A | * | 10/2000 | Enzensberger ....... B60L 3/0023 |
| | | | | 363/54 |
| 11,065,983 | B2 | * | 7/2021 | Li ............................ B60L 5/36 |
| 2007/0278059 | A1 | | 12/2007 | Afriat |
| 2010/0147184 | A1 | * | 6/2010 | Kitanaka ............ H02P 29/0241 |
| | | | | 236/49.3 |
| 2011/0315043 | A1 | | 12/2011 | Kumar |
| 2020/0139848 | A1 | * | 5/2020 | Li ............................ B60L 5/36 |

FOREIGN PATENT DOCUMENTS

| | | | | | |
|---|---|---|---|---|---|
| CN | 103840477 | A | | 6/2014 | |
| CN | 203995757 | U | | 12/2014 | |
| CN | 104527459 | A | | 4/2015 | |
| CN | 205651990 | U | | 10/2016 | |
| CN | 107299567 | A | | 10/2017 | |
| CN | 107696873 | A | * | 2/2018 | ............... B60L 9/28 |
| CN | 107962982 | A | | 4/2018 | |
| CN | 106379200 | B | * | 6/2018 | ............. B60M 3/00 |
| CN | 109532568 | A | | 3/2019 | |
| CN | 209381847 | U | | 9/2019 | |
| EP | 3135530 | A1 | | 3/2017 | |
| GB | 2328663 | A | | 3/1999 | |
| JP | 54153409 | A | | 12/1979 | |
| JP | 2007523589 | A | | 8/2007 | |
| JP | 2009113691 | A | | 5/2009 | |
| KR | 20180100917 | A | | 9/2018 | |

* cited by examiner

THREE-RAIL POWER SUPPLY CONTROL SYSTEM FOR ELECTRIFIED RAILWAY TRAIN

CROSS-REFERENCE TO RELATED APPLICATIONS

This application is a 371 of PCT Application No. PCT/CN2019/093245 filed on Jun. 27, 2019, which claims priority to Chinese Application No. 201910019226.9, filed Jan. 9, 2019, the contents of which are hereby incorporated by reference as if recited in their entirety.

FIELD OF THE INVENTION

The present invention relates to the technical fields of train power supply and operation control.

BACKGROUND OF THE INVENTION

Existing main line electrified railway trains are powered by a power frequency single-phase alternating current (AC) power supply system. Electrical equipment plays an important role on locomotives and motor cars of trains, wherein the most important component is an AC-DC-AC traction drive system. The AC-DC-AC traction drive system is formed by connecting an on-board traction transformer, a traction converter and a traction motor in series, and achieves the purpose of train drive and speed regulation operation by driving the traction motor and changing the speed of the traction motor through frequency regulation and voltage regulation, and the process is called train driving. In reality, train driving is usually done by manual operation, and a few trains are driven automatically. Some problems exist here. The first problem is that the AC-DC-AC traction drive system occupies an absolute weight in the electrical equipment on the main line railway locomotives and motor cars, the weight is high, and the size is large; and due to the high weight, the axle load is increased, the larger the axle load, the higher the line cost, since the size is large, more valuable spaces of locomotives and motor cars are occupied, and then the power density and efficiency are lowered. The second problem is that intelligent control and automatic train control (ATC) are the only way to replace manual driving. However, in the case of the current power supply modes of trains, execution equipment required for driving is installed on the trains, and the trains are mobile, even move at high speed, while the commands and structure of automatic train control (ATC) come from a ground control center, the two cannot directly communicate with each other, wireless system communication is required, and wireless system breakdowns or failures will inevitably cause certain safety risks.

The technical problems to be solved now are to omit an on-board traction transformer and a traction converter on the one hand, lower the weight of on-board electrical equipment, reduce the axle load, realise the light-weight trend of trains, improve the load-carrying efficiency of trains, increase the power density of locomotives and motor cars, and make the trains adapt to higher-speed operation, on the other hand, directly realise automatic control of train operation and unmanned driving through ground power supply.

SUMMARY OF THE INVENTION

The present invention aims to provide a three-rail power supply control system for electrified railway trains, by changing a traditional power supply mode and optimizing the system structure, an on-board traction transformer and a traction converter are omitted, the axle load is effectively lowered, the light-weight trend of trains is realised, the load-carrying efficiency of trains is improved, the power density of locomotives and motor cars is increased, and the trains can adapt to higher-speed operation, and meanwhile, automatic control of train operation and unmanned driving are directly realised through ground power supply.

The purposes of the present invention are achieved through the following technical solutions: a three-rail power supply control system for electrified railway trains comprises a running rail along an electrified railway, a power supply rail laid parallel to the running rail, an AC-DC-AC variable-frequency and variable-voltage device and a rectifying device arranged on the ground, and an on-board current collector, a traction motor and auxiliary electric equipment arranged on a train; the power supply rail comprises a first power supply rail, a second power supply rail and a third power supply rail; the first power supply rail, the second power supply rail and the running rail form a three-phase AC power supply circuit which is powered by the AC-DC-AC variable-frequency and variable-voltage device arranged on the ground; the running rail is grounded; the third power supply rail and the running rail form a DC power supply circuit which is powered by the rectifying device arranged on the ground; the on-board current collector comprises a first current collector, a second current collector, a third current collector and a fourth current collector; the tail ends of the first current collector, the second current collector and the fourth current collector are connected to a three-phase terminal of the traction motor of the train through cables, and the front ends of the first current collector, the second current collector and the fourth current collector are in contact with the first power supply rail, the second power supply rail and the running rail for power receiving; meanwhile, the tail end of the third current collector is connected to a positive pole of the auxiliary electric equipment of the train through a cable, the front end of the third current collector is in contact with the third power supply rail for power receiving, and the tail end of the fourth current collector is connected to a negative pole of the auxiliary electric equipment of the train through a cable; the AC-DC-AC variable-frequency and variable-voltage device supplies power to the traction motor of the train through the first power supply rail and the first current collector, the second power supply rail and the second current collector, and the running rail and the fourth current collector, and the train is controlled to start, stop and operate by controlling the frequency and voltage of the AC-DC-AC variable-frequency and variable-voltage device to vary; and the rectifying device supplies power to the auxiliary electric equipment of the train through the third power supply rail and the third current collector, and the running rail and the fourth current collector.

Preferably, the running rail comprises a first running rail and a second running rail connected in parallel with the first running rail.

Further preferably, the first power supply rail, the second power supply rail and the third power supply rail are laid on sleepers or ballast beds between the first running rail and the second running rail; and the first power supply rail and the second power supply rail are divided into several sections, and each section is powered by an independent AC-DC-AC variable-frequency and variable-voltage device to realise section control of the train operation.

Preferably, the traction motor of the train is a synchronous motor or an asynchronous motor.

Preferably, the auxiliary electric equipment of the train mainly comprises train air conditioning equipment, lighting equipment and other equipment; and the auxiliary electric equipment and the rectifying device adopt the same voltage level.

Further preferably, the on-board current collector is arranged at the end of a bogie of the train and is insulated from the bogie of the train, and the first current collector, the second current collector, the third current collector and the fourth current collector of the on-board current collector are insulated from each other.

Compared with the prior art, the present invention has the beneficial effects that:

1. Two power supply rails and the running rail (grounded) form the three-phase AC power supply circuit, the third power supply rail and the running rail form a DC power supply circuit, the ground AC-DC-AC variable-frequency and variable-voltage device supplies power to the traction motor of the train through the three-phase AC power supply circuit, and the ground rectifying device provides auxiliary power for the train through the DC power supply circuit, so that the power supply structure and power supply mode are optimised, an on-board traction transformer and a traction converter are omitted, the axle load of the train is effectively lowered, the light-weight trend of trains is realised, the power density of locomotives and motor cars is increased, and the load-carrying efficiency of trains is improved.

2. The ground AC-DC-AC variable-frequency and variable-voltage device is used to supply power to the traction motor of the train through the three-phase AC power supply circuit, so that the automatic control of train driving and operation is directly carried out, and unmanned driving and intelligent control and operation are achieved.

3. The power supply rails of the present invention are low in cost and good in economic performance.

4. The auxiliary electric equipment adopts the same voltage level, so that there is no need for voltage conversion between the on-board equipment, which is convenient and concise.

5. The ground AC-DC-AC variable-frequency and variable-voltage device and rectifying device do not generate negative sequence current in a power grid, thus ensuring the quality of power energy.

6. The technology is advanced, the performance is superior, and implementation is easy.

DETAILED DESCRIPTION OF THE EMBODIMENTS

In order to better understand the creative ideas of the present invention, the working principle of the present invention will be briefly explained as follows: compared with existing AC-DC-AC locomotives and motor cars, on-board electrical equipment such as on-board traction transformers and traction converters can be omitted, and the axle load of trains can be effectively reduced, the power density and load-carrying efficiency are improved, meanwhile, large-capacity drive (traction) power is separated from small-capacity auxiliary power, three-phase AC and DC are adopted for power supply to complement each other and coordinately supply power, a system power supply structure and power supply mode are optimised, train driving and operation control are directly realised through the frequency-regulation and voltage-regulation power supply by the ground three-phase AC power supply circuit, and unmanned driving is realised. The present invention will be further described below in conjunction with the accompanying drawings and specific embodiments.

Embodiment 1

Figure 1:
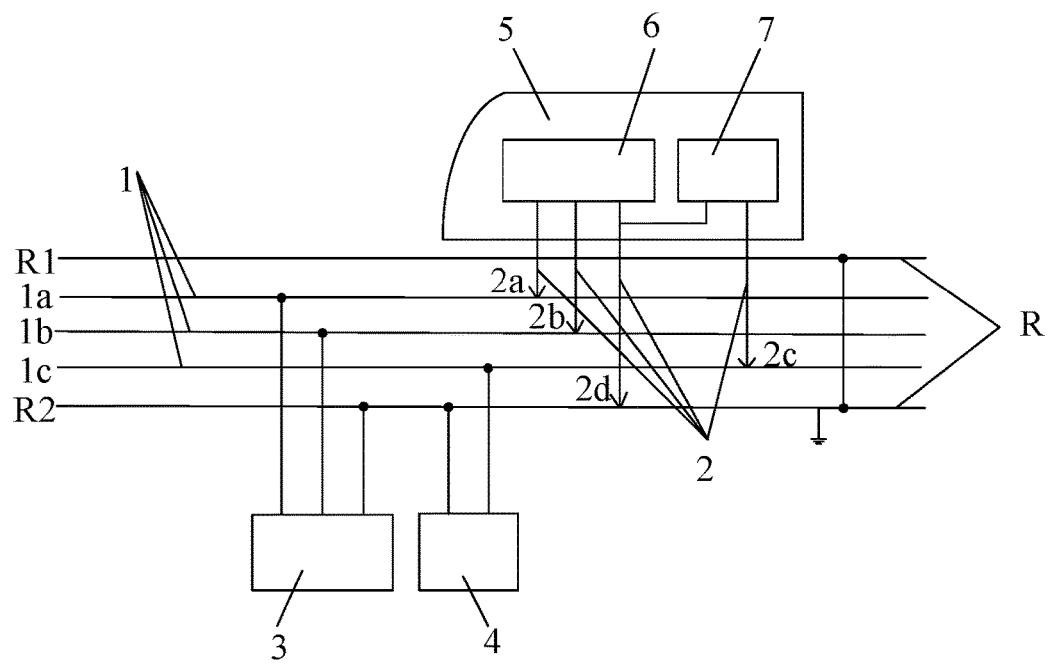
FIG. 1 is a structural schematic diagram of Embodiment 1 of the present invention.

As shown in FIG. 1, an embodiment of the present invention provides a three-rail power supply control system for electrified railway trains, the system comprises a running rail R along an electrified railway, a power supply rail 1 laid parallel to the running rail R, an AC-DC-AC variable-frequency and variable-voltage device 3 and a rectifying device 4 arranged on the ground, and an on-board current collector 2, a traction motor 6 and auxiliary electric equipment 7 arranged on a train 5; the AC-DC-AC variable-frequency and variable-voltage device 3 and the rectifying device 4 respectively supply power to the traction motor 6 and the auxiliary electric equipment 7 of the train through the power supply rail 1, the running rail R and the on-board current collector 2; the power supply rail 1 comprises a first power supply rail 1a, a second power supply rail 1b and a third power supply rail 1c; the first power supply rail 1a, the second power supply rail 1b and the running rail R form a three-phase AC power supply circuit which is powered by the AC-DC-AC variable-frequency and variable-voltage device 3 arranged on the ground; the running rail R is grounded; the third power supply rail 1c and the running rail R form a DC power supply circuit which is powered by the rectifying device 4 arranged on the ground; the on-board current collector 2 comprises a first current collector 2a, a second current collector 2b, a third current collector 2c and a fourth current collector 2d; the tail ends of the first current collector 2a, the second current collector 2b and the fourth current collector 2d are connected to a three-phase terminal of the traction motor 6 of the train 5 through cables, and the front ends of the first current collector 2a, the second current collector 2b and the fourth current collector 2d are in contact with the first power supply rail 1a, the second power supply rail 1b and the running rail R respectively for power receiving; meanwhile, the tail end of the third current collector 2c is connected to a positive pole of the auxiliary electric equipment 7 of the train 5 through a cable, the front end of the third current collector 2c is in contact with the third power supply rail 1c for power receiving, and the tail end of the fourth current collector 2d is connected to a negative pole of the auxiliary electric equipment 7 of the train 5 through a cable; the AC-DC-AC variable-frequency and variable-voltage device 3 supplies power to the traction motor 6 of the train 5 through the first power supply rail 1a and the first current collector 2a, the second power supply rail 1b and the second current collector 2b, and the running rail R and the fourth current collector 2d, and the train 5 is controlled to start, stop and operate by controlling the frequency and voltage of the AC-DC-AC variable-frequency and variable-voltage device 3 to vary; and the rectifying device 4 supplies power to the auxiliary electric equipment 7 of the train 5 through the third power supply rail 1c and the third current collector 2c, and the running rail R and the fourth current collector 2d.

In the embodiment of the present invention, the running rail R comprises a first running rail R1 and a second running rail R2; and the first running rail R1 and the second running rail R2 are connected in parallel through a wire. The first power supply rail 1a, the second power supply rail 1b and the third power supply rail 1c are laid on sleepers or ballast beds between the first running rail R1 and the second running rail R2.

In the embodiment of the present invention, the traction motor 6 of the train 5 is a synchronous motor or an asynchronous motor.

The auxiliary electric equipment 7 of the train 5 mainly comprises train air conditioning equipment, lighting equipment and other equipment; and the auxiliary electric equipment 7 and the rectifying device 4 adopt the same voltage level.

The on-board current collector 2 is installed at the end of a bogie of the train 5 and is insulated from the bogie of the train 5, and the first current collector 2a, the second current collector 2b, the third current collector 2c and the fourth current collector 2d of the on-board current collector 2 are insulated from each other.

Both the AC-DC-AC variable-frequency and variable-voltage device 3 and the rectifying device 4 are powered by a three-phase cable for substation.

Embodiment 2

Figure 2:
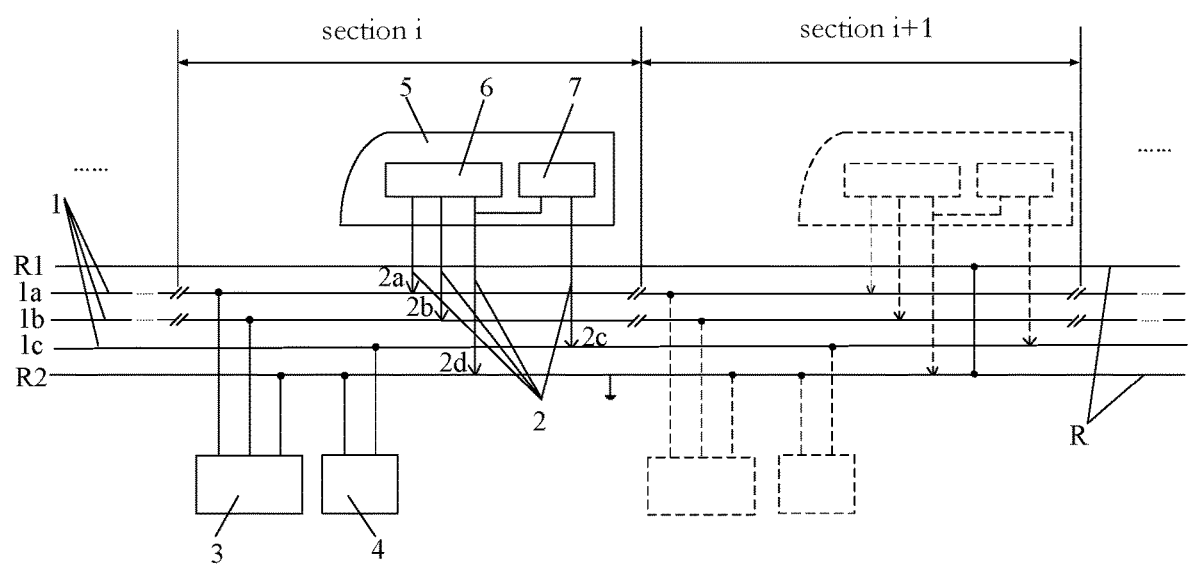
FIG. 2 is a structural schematic diagram of Embodiment 2 of the present invention.

As shown in FIG. 2, an embodiment of the present invention provides a three-rail power supply control system for electrified railway trains, the system comprises a running rail R along an electrified railway, a power supply rail 1 laid parallel to the running rail R, AC-DC-AC variable-frequency and variable-voltage devices 3 and rectifying devices 4 arranged on the ground, and on-board current collectors 2, traction motors 6 and auxiliary electric equipment 7 arranged on trains 5; the AC-DC-AC variable-frequency and variable-voltage devices 3 and the rectifying devices 4 respectively supply power to the traction motors 6 and the auxiliary electric equipment 7 of the trains through the power supply rail 1, the running rail R and the on-board current collectors 2; the power supply rail 1 comprises a first power supply rail 1a, a second power supply rail 1b and a third power supply rail 1c; the first power supply rail 1a, the second power supply rail 1b and the running rails R form a three-phase AC power supply circuit which is powered by the AC-DC-AC variable-frequency and variable-voltage devices 3 arranged on the ground; the running rail R is grounded; the third power supply rail 1c and the running rail R form a DC power supply circuit which is powered by the rectifying devices 4 arranged on the ground; the on-board current collectors 2 comprise a first current collectors 2a, a second current collectors 2b, a third current collectors 2c and a fourth current collectors 2d; the tail ends of the first current collectors 2a, the second current collectors 2b and the fourth current collectors 2d are connected to three-phase terminals of the traction motors 6 of the trains 5 through cables, and the front ends of the first current collectors 2a, the second current collectors 2b and the fourth current collectors 2d are in contact with the first power supply rail 1a, the second power supply rail 1b and the running rail R respectively for power receiving; meanwhile, the tail ends of the third current collectors 2c are connected to the positive poles of the auxiliary electric equipment 7 of the trains 5 through cables, the front ends of the third current collectors 2c are in contact with the third power supply rail 1c for power receiving, and the tail ends of the fourth current collectors 2d are connected to the negative poles of the auxiliary electric equipment 7 of the trains 5 through cables; the AC-DC-AC variable-frequency and variable-voltage devices 3 supply power to the traction motors 6 of the trains 5 through the first power supply rail 1a and the first current collectors 2a, the second power supply rail 1b and the second current collectors 2b, and the running rail R and the fourth current collectors 2d, and the trains 5 are controlled to start, stop and operate by controlling the frequency and voltage of the AC-DC-AC variable-frequency and variable-voltage devices 3 to vary; and the rectifying devices 4 supply power to the auxiliary electric equipment 7 of the trains 5 through the third power supply rail 1c and the third current collectors 2c, and the running rail R and the fourth current collectors 2d.

The main difference between the present embodiment of the present invention and the Embodiment 1 above is that the first power supply rail 1a and the second power supply rail 1b are divided into several sections, and each section is powered by an independent AC-DC-AC variable-frequency and variable-voltage device 3 to realise section control of operation of the trains 5. In the specific embodiment of the present invention, the two adjacent sections are denoted as section i and section i+1 (i is greater than or equal to 1), and each section is powered by an independent AC-DC-AC variable-frequency and variable-voltage device 3, so that section control of the trains 5 is facilitated. In order to ensure the safety and control of the train, only one train can pass through each section generally.

In the embodiment of the present invention, the running rail R comprises a first running rail R1 and a second running rail R2; and the first running rail R1 and the second running rail R2 are connected in parallel through a wire. The first power supply rail 1a, the second power supply rail 1b and the third power supply rail 1c are laid on sleepers or ballast beds between the first running rail R1 and the second running rail R2.

In the embodiment of the present invention, the traction motor 6 of the train 5 is a synchronous motor or an asynchronous motor.

The auxiliary electric equipment 7 of the trains 5 mainly comprises train air conditioning equipment, lighting equipment and other equipment; and the auxiliary electric equipment 7 and the rectifying devices 4 adopt the same voltage level.

The on-board current collector 2 is installed at the end of a bogie of the train 5 and is insulated from the bogie of the train 5, and the first current collector 2a, the second current collector 2b, the third current collector 2c and the fourth current collector 2d of the on-board current collector 2 are insulated from each other.

Both the AC-DC-AC variable-frequency and variable-voltage device and the rectifying device are powered by a three-phase cable for substation.

In summary, by changing a traditional power supply mode and optimizing the system structure, the weight of on-board equipment is effectively reduced, the axle load is effectively lowered, the light-weight trend of trains is realised, the load-carrying efficiency of trains is improved, the power density of locomotives and motor cars is increased, and the trains can adapt to higher-speed operation, and meanwhile, automatic control of train operation and unmanned driving are directly realised through ground power supply.

The invention claimed is:

1. A three-rail power supply control system for electrified railway trains, comprising a running rail along an electrified railway, a power supply rail laid parallel to the running rail, an AC-DC-AC variable-frequency and variable-voltage device and a rectifying device arranged on the ground, and an on-board current collector, a traction motor and auxiliary electric equipment arranged on a train, and the power supply rail comprises a first power supply rail, a second power supply rail and a third power supply rail; the first power supply rail, the second power supply rail and the running rail form a three-phase AC power supply circuit which is powered by the AC-DC-AC variable-frequency and variable-voltage device arranged on the ground; the running rail is grounded; the third power supply rail and the running rails form a DC power supply circuit which is powered by the rectifying device arranged on the ground; the on-board current collector comprises a first current collector, a second current collector, a third current collector and a fourth current collector; tail ends of the first current collector, the second current collector and the fourth current collector are connected to a three-phase terminal of the traction motor of the train through cables, and front ends of the first current collector, the second current collector and the fourth current collector are in contact with the first power supply rail, the second power supply rail and the running rail respectively for power receiving; the tail end of the third current collector is connected to a positive pole of the auxiliary electric equipment of the train through a cable, the front end of the third current collector is in contact with the third power supply rail for power receiving, and the tail end of the fourth current collector is connected to a negative pole of the auxiliary electric equipment of the train through a cable; the AC-DC-AC variable-frequency and variable-voltage device supplies power to the traction motor of the train through the first power supply rail and the first current collector, the second power supply rail and the second current collector, and the running rail and the fourth current collector, and the train is controlled to start, stop and operate by controlling the frequency and voltage of the AC-DC-AC variable-frequency and variable-voltage device to vary; and the rectifying device supplies power to the auxiliary electric equipment of the train through the third power supply rail and the third current collector, and the running rail and the fourth current collector.

2. The three-rail power supply control system for electrified railway trains according to claim 1, wherein the running rail comprises a first running rail and a second running rail connected in parallel with the first running rail.

3. The three-rail power supply control system for electrified railway trains according to claim 2, wherein the first power supply rail, the second power supply rail and the third power supply rail are laid on sleepers or ballast beds between the first running rail and the second running rail; and the first power supply rail and the second power supply rail are divided into sections according to a train operation range, and each section is powered by an independent AC-DC-AC variable-frequency and variable-voltage device.

4. The three-rail power supply control system for electrified railway trains according to claim 1, wherein the traction motor of the train is a synchronous motor or an asynchronous motor.

5. The three-rail power supply control system for electrified railway trains according to claim 1, wherein the auxiliary electric equipment of the train comprises train air conditioning equipment and lighting equipment; and the auxiliary electric equipment and the rectifying device adopt the same voltage level.

6. The three-rail power supply control system for electrified railway trains according to claim 1, wherein the on-board current collector is arranged at the end of a bogie of the train and is insulated from the bogie of the train, and the first current collector, the second current collector, the third current collector and the fourth current collector of the on-board current collector are insulated from each other.

* * * * *